United States Patent
Wagner

(10) Patent No.: US 10,006,489 B2
(45) Date of Patent: Jun. 26, 2018

(54) METHOD FOR COMPENSATING A LOW-FREQUENCY DISTURBANCE FORCE OF A ROTOR BY MEANS OF ACTIVE MAGNETIC BEARINGS, ACTIVE MAGNETIC BEARING HAVING A COMPENSATION CONTROL CIRCUIT FOR PERFORMING THE COMPENSATION, AND USE OF THE MAGNETIC BEARING

(71) Applicant: SIEMENS AKTIENGESELLSCHAFT, München (DE)

(72) Inventor: Norbert Wagner, Bottrop (DE)

(73) Assignee: SIEMENS AKTIENGESELLSCHAFT (DE)

( * ) Notice: Subject to any disclaimer, the term of this patent is extended or adjusted under 35 U.S.C. 154(b) by 280 days.

(21) Appl. No.: 14/907,306

(22) PCT Filed: Jul. 7, 2014

(86) PCT No.: PCT/EP2014/064410
§ 371 (c)(1),
(2) Date: Jan. 25, 2016

(87) PCT Pub. No.: WO2015/043785
PCT Pub. Date: Apr. 2, 2015

(65) Prior Publication Data
US 2016/0195132 A1 Jul. 7, 2016

(30) Foreign Application Priority Data
Sep. 24, 2013 (DE) ........................ 10 2013 219 196

(51) Int. Cl.
*H02K 7/09* (2006.01)
*F16C 32/04* (2006.01)

(52) U.S. Cl.
CPC ...... *F16C 32/0442* (2013.01); *F16C 32/0444* (2013.01); *F16C 32/0451* (2013.01); *H02K 7/09* (2013.01); *F16C 2360/44* (2013.01)

(58) Field of Classification Search
CPC .............. F16C 32/0451–32/0455; H02K 7/09
(Continued)

(56) References Cited

U.S. PATENT DOCUMENTS

| 4,626,754 A | 12/1986 | Habermann et al. |
| 4,806,835 A | 2/1989 | Habermann |

(Continued)

FOREIGN PATENT DOCUMENTS

| CN | 101488031 A | 7/2009 |
| CN | 101599670 A | 12/2009 |

(Continued)

OTHER PUBLICATIONS

International Search Report; PCT/EP2014/064410; 3 Pgs.
Written Opinion; PCT/EP2014/064410; 6 Pgs.

*Primary Examiner* — Ramon M Barrera
(74) *Attorney, Agent, or Firm* — Schmeiser Olsen & Watts LLP

(57) ABSTRACT

A method for compensating at least one low-frequency mechanical disturbance oscillation, which is caused in a rotor of an active magnetic bearing by the action of a disturbance force on the rotor is provided. The mechanical disturbance oscillation has a disturbance oscillation frequency below a rotational frequency of the rotor. The method includes the following steps: a) analyzing the low-frequency mechanical disturbance oscillation, b) determining a compensation force for producing in the rotor a mechanical compensation force that counteracts the mechanical disturbance oscillation, and c) applying the compensation force to the rotor, wherein steps a), b), and c) are performed by means of at least one compensation control (Continued)

circuit of the active magnetic bearing that is decoupled from a magnetic-bearing control circuit for controlling the active magnetic bearing. The invention further relates to a corresponding active magnetic bearing.

12 Claims, 1 Drawing Sheet

(58) Field of Classification Search
USPC .......................................................... 310/90.5
See application file for complete search history.

(56) References Cited

U.S. PATENT DOCUMENTS

| | | |
|---|---|---|
| 4,999,534 A | 3/1991 | Andrianos |
| 5,760,511 A | 6/1998 | Nakagawa et al. |
| RE41,035 E | 12/2009 | Ohtachi et al. |
| 2004/0041478 A1 | 3/2004 | Ohtachi et al. |

FOREIGN PATENT DOCUMENTS

| | | |
|---|---|---|
| DE | 2263096 A1 | 7/1974 |
| EP | 0157693 A1 | 10/1985 |
| EP | 0275791 A1 | 7/1988 |
| EP | 0381898 A2 | 8/1990 |
| RU | 2460909 C1 | 9/2012 |
| SU | 1744313 A1 | 6/1992 |

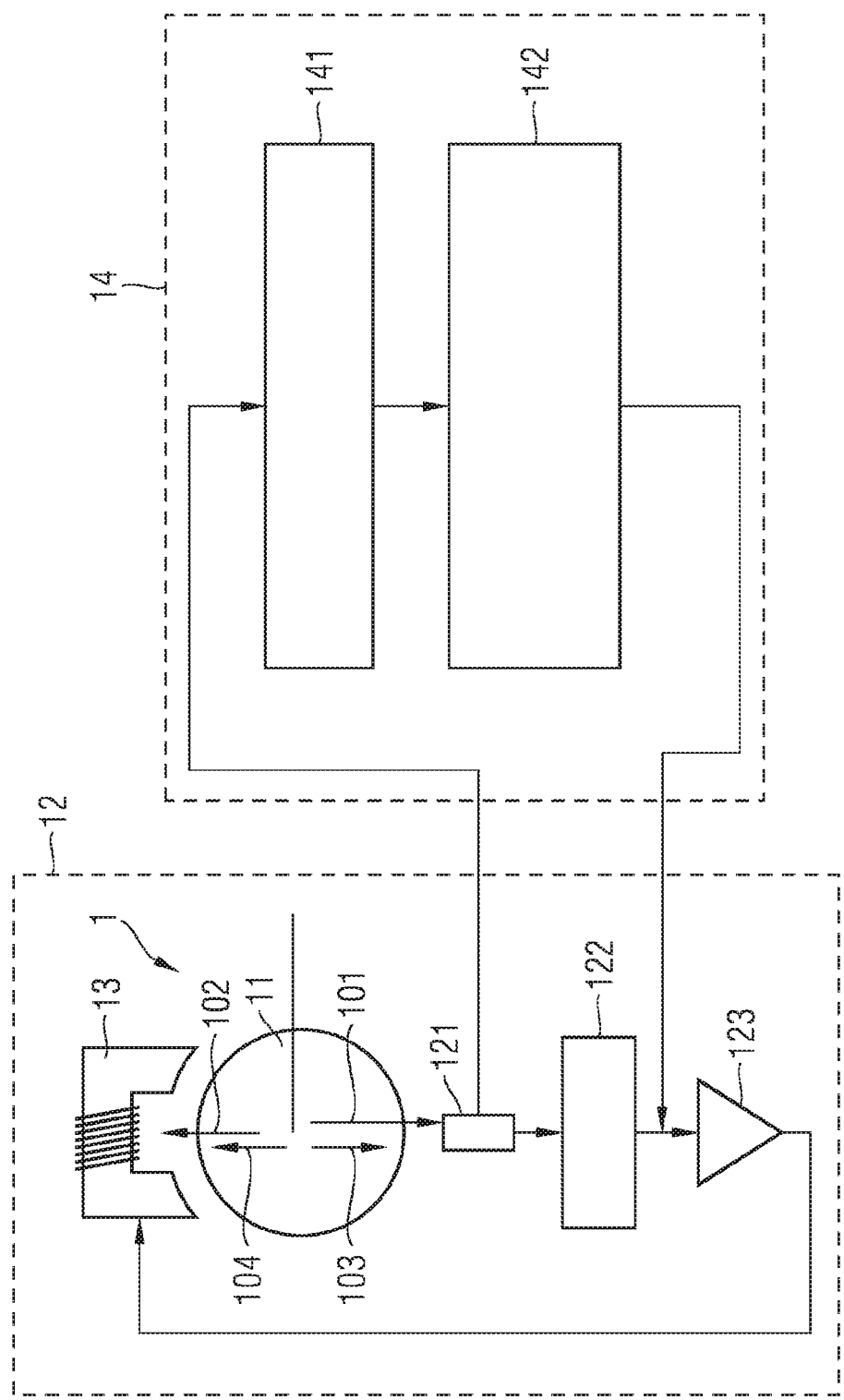

METHOD FOR COMPENSATING A LOW-FREQUENCY DISTURBANCE FORCE OF A ROTOR BY MEANS OF ACTIVE MAGNETIC BEARINGS, ACTIVE MAGNETIC BEARING HAVING A COMPENSATION CONTROL CIRCUIT FOR PERFORMING THE COMPENSATION, AND USE OF THE MAGNETIC BEARING

CROSS-REFERENCE TO RELATED APPLICATIONS

This application claims priority to PCT Application No. PCT/EP2014/064410, having a filing date of Jul. 7, 2014, based off of European Application No. 102013219196.0 having a filing date of Sep. 24, 2013, the entire contents of which are hereby incorporated by reference.

FIELD OF TECHNOLOGY

The following relates to a method for compensating a low-frequency mechanical disturbance oscillation which occurs in a rotor having at least one active magnetic bearing (magnetically-supported rotor). Furthermore, the following relates to an active magnetic bearing having a compensation control loop for performing the compensation. Moreover, a use of the active magnetic bearing is specified.

BACKGROUND

An active magnetic bearing (AMB) is used, for example, in a turbo compressor. Because of the special characteristics of turbo compressors and the special characteristics of the magnetic bearings, the following problems can occur: Depending on the aerodynamic design of the turbo compressor, in the specified operating range of the latter, disturbing forces can be exerted on the rotor by aerodynamic phenomena, resulting in unacceptably severe mechanical oscillations (oscillations with high oscillation amplitudes). In order to protect the turbo compressor against damage, the turbo compressor is shut down in the event of impermissibly severe mechanical oscillations.

As compared with oil-lubricating bearings, magnetic bearings have a lower bearing stiffness. A relatively low bearing stiffness benefits the occurrence of mechanical oscillations with high oscillation amplitudes. This applies in particular in the case of disturbance forces with a low disturbance frequency (excitation frequency). For example, the known flow phenomenon "rotating diffuser stall" meets the above-described conditions and, in turbo compressors with magnetic bearings, can lead to mechanical oscillations with impermissibly high amplitudes.

SUMMARY

An aspect relates to how the occurrence of impermissibly high mechanical oscillations in an active magnetic bearing can be suppressed.

Embodiments of the invention specify a method for compensating at least one low-frequency mechanical disturbance oscillation which is caused in a rotor of an active magnetic bearing as a result of the action of a disturbance force on the rotor. The mechanical disturbance oscillation has a disturbance oscillation frequency of less than 100 Hz.

The method comprises the following method steps:

a) analyzing the low-frequency mechanical disturbance oscillation, which leads to a disturbance force analysis result, b) determining a compensation force on the basis of the disturbance force analysis result in order to generate a mechanical compensation force in the rotor that counteracts the mechanical disturbance oscillation, and c) generating the mechanical compensation oscillation counteracting the mechanical disturbance oscillation in the rotor by introducing the compensation force into the rotor, wherein the method steps a), b) and c) are performed with the aid of at least one compensation control loop of the active magnetic bearing that is decoupled from a magnetic bearing control loop for controlling the active magnetic bearing.

Embodiments of the invention also specifies an active magnetic bearing having a rotor, at least one magnetic bearing control loop for controlling the active magnetic bearing and at least one compensation control loop, which is decoupled from the magnetic bearing control loop, for the compensation of at least one low-frequency mechanical disturbance oscillation. The mechanical disturbance oscillation can be caused in the rotor of the active magnetic bearing by the action of a disturbance force on the rotor. Here, the mechanical disturbance oscillation has a disturbance frequency which lies below the rotational frequency of the rotor.

With the aid of the compensation control loop, the amplitude of the mechanical disturbance oscillation brought about by the disturbance force in the rotor (shaft) is reduced. Here, the mechanical disturbance oscillation can be partly or virtually completely eliminated.

A maximum amplitude $A(\omega_x)$ of the disturbance oscillation at the disturbance frequency $\omega_x$ is reduced to a value below a permissible limiting value.

For example, the disturbance force is an aerodynamic disturbance force acting from outside. Such an aerodynamic disturbance force is a low-frequency external disturbance in the sense of a "forced oscillation". The aerodynamic disturbance force acts on the rotor/bearing system and effects the mechanical disturbance oscillation in the rotor. In order to compensate this low-frequency disturbance, it is proposed to counteract the disturbance forces by applying compensation forces to the rotor via an additional activation of the magnetic bearing that is independent of the magnetic bearing control loop, specifically counteracting the disturbance forces and thus preventing the occurrence of greater oscillation amplitudes in the rotor. For the specific connection of the compensation forces, use is made of a suitable algorithm which calculates said compensation forces in terms of magnitude, phase angle and frequency, such that the oscillation amplitudes in the relevant frequency range are reduced.

The basic idea of embodiments of the invention consists in not using the magnetic bearing control loop but a separate compensation control loop for the compensation and the damping of the disturbance oscillation. Magnetic bearing control loop and compensation control loop are decoupled from each other, i.e. are separated. As a result of this separation, a detrimental effect of a compensation of the disturbance oscillation can be reduced without influencing the characteristics of the magnetic bearing control loop disadvantageously.

The separation or decoupling of magnetic bearing control loop and compensation control loop means that it is entirely possible for existing elements of the magnetic bearing control loop, e.g. sensors, amplifiers or actuators and output variables thereof, to be used for the compensation control loop.

The characteristics of the magnetic bearing contribute decisively to the occurrence of high (shaft) oscillations in the event of existing low-frequency disturbance forces. These characteristics of the magnetic bearing are in turn determined substantially by the design of the magnetic bearing control loop and dynamic characteristics of hardware components that are used.

In the design of the magnetic bearing control loop, it is necessary to ensure an overall acceptable behavior of the entire system. This applies in particular with regard to characteristics of the magnetic bearing, inter-alia bearing stiffness of the magnetic bearing, in the rotational frequency range from about 100 Hz to about 1000 Hz, so that mere optimization of the magnetic bearing control loop with regard to maximum bearing stiffness in the disturbance frequency range from about 1 Hz to about 50 Hz would not be expedient.

In order to optimize the design of the magnetic bearing control loop, so-called filter modules are frequently used with the aim of raising or lowering amplification of an electric control loop signal in a relatively narrow frequency range. However, since, as a result of incorporating filter modules in a magnetic bearing control loop, in addition to the amplification or attenuation of a signal, the phase angle of the latter is also changed, filter modules of such types have only limited possible uses with regard to achieving an overall acceptable behavior of the entire system. By using embodiments of the invention, it is possible, at least to some extent, to dispense with the use of filter modules for the magnetic bearing control loop in order to optimize the design of the magnetic bearing control loop.

It is recommended to repeat or perform the method at regular time intervals or else continuously during operation of the magnetic bearing. As a result of the repeated or continuous performance of the method, it is ensured that unwantedly severe mechanical disturbance oscillations in the rotor with magnetic bearings do not occur during operation. According to a particular refinement, the method steps a) and b) are therefore performed repeatedly during an operating phase of the magnetic bearing.

The analysis of the low-frequency mechanical disturbance oscillation, the determination of a compensation force and the generation and introduction of the mechanical (or electromagnetic) compensation force counteracting the mechanical disturbance oscillation can in principle be performed with the aid of a common algorithm. However, it is advantageous to execute these individual method steps separately from one another. According to a particular refinement, the method steps a), b) and/or c) are therefore performed with the aid of different algorithms. It is also conceivable to use an algorithm having different parts to execute the method steps a), b) and/or c).

According to a further refinement, in order to analyze the low-frequency disturbance oscillation, a frequency analysis of a time-based signal of a rotor deflection of the rotor is performed. The frequency analysis is performed in particular with the aid of FFT (Fast Fourier Transformation).

With the aid of the method, low-frequency disturbance oscillation is compensated or damped. Here, it is in principle possible to cover a wide frequency spectrum. The frequency analysis is preferably performed for a frequency spectrum (frequency band) from the frequency range from 1 Hz to 50 Hz and in particular from the frequency range from 1 Hz to 30 Hz and once more in particular from the frequency range from 1 Hz to 20 Hz. Disturbance oscillations in particular from these frequency ranges can bring about very high, unacceptable oscillation amplitudes. By using embodiments of the invention, such high oscillation amplitudes are reduced.

For the analysis of the disturbance oscillation, various oscillation parameters of the disturbance oscillation and different evaluations of the oscillation parameters can be used or performed. According to a particular refinement, in order to analyze the low-frequency disturbance oscillation, a determination of a disturbance amplitude $A_p$ of the disturbance oscillation and a comparison of the disturbance amplitude $A_p$ determined and a predetermined limiting amplitude $A_{lim}$, are performed. The amplitudes correspond, for example, to a radial deflection of the rotor. The radial deflection is, for example a few μm.

By means of the comparison of the disturbance amplitude $A_p$ determined and the predetermined limiting amplitude $A_{lim}$ with each other, it is established in particular whether the disturbance amplitude $A_p$ is smaller than, equal to, or greater than the predetermined limiting amplitude $A_{lim}$. The comparison is performed, for example, by forming the ratio of the disturbance amplitude $A_p$ and the predetermined limiting amplitude $A_{lim}$.

For the case in which the disturbance amplitude $A_p$ is equal to or greater than the predetermined limiting amplitude $A_{lim}$, a determination of a phase angle φP of the disturbance oscillation is performed. The phase angle φP determined and/or the disturbance amplitude $A_p$ and also the disturbance frequency $\omega_x$ of the disturbance oscillation are used as input variables for the compensation control loop. Phase angle φP and/or the disturbance amplitude $A_p$ are used to determine the compensation force and/or the compensation oscillation.

The active magnetic bearing can be used in many areas of the technology, in particular where oscillation-free supporting of sensitive components is necessary. Examples of this are magnetically supported turbo machines, fans, refrigerating machines, vacuum pumps and tool spindles.

In particular, the active magnetic bearing is used in turbo compressors. According to a further aspect of embodiments of the invention, therefore, a use of the active magnetic bearing in a turbo compressor is specified, wherein a rotor of the turbo compressor is supported with the aid of the active magnetic bearing.

BRIEF DESCRIPTION

Some of the embodiments will be described in detail, with reference to the following figures, wherein like designations denote like members, wherein:

FIG. 1 shows, schematically, an embodiment of an active magnetic bearing with associated control loops.

DETAILED DESCRIPTION

Provided is an active magnetic bearing 1 of a turbo compressor. The active magnetic bearing 1 has a rotor 11 and a closed magnetic bearing control loop 12 for controlling the active magnetic bearing 1.

Alongside there is a compensation control loop 14, decoupled from a magnetic bearing control loop 12, for the compensation of a low-frequency mechanical disturbance oscillation, which can be caused in the rotor 11 of the active magnetic bearing 1 as a result of the action of a disturbance force 103 on the rotor 11. The mechanical disturbance oscillation has a disturbance frequency below the rotational frequency of the rotor 11.

The magnetic bearing 1 is formed with the aid of the stator (indicated by the electromagnet 13). The rotor 11 is supported without contact in the stator 13 with the aid of the magnetic bearing 1 (magnetically supported rotor). Control of the non-contact supporting is performed by the magnetic bearing control loop 12. Components of the magnetic bearing control loop 12 are, inter-alia, a so-called displacement sensor (position sensor, travel sensor) 121, which detects a change in the position of the rotor 11, and also a control unit (controller) 122 and a signal amplifier (power amplifier) 123.

During operation of the magnetic bearing 1, various forces act on the rotor 11. These forces are, inter-alia, gravitational force 101 and electromagnetic force 102. Gravitational force 101 and electromagnetic force 102 are directed counter to each other, according to the figure.

Apart from gravitational force 101 and electromagnetic force 102, an external low-frequency disturbance force 103 can act on the rotor 11. The disturbance force 103 is an aerodynamic disturbance force. This disturbance force acts periodically on the rotor 11 and, as a result, causes a mechanical low-frequency disturbance oscillation in the rotor 11. The low-frequency disturbance oscillation has a disturbance frequency $\omega_x$ of less than 50 Hz.

To compensate the low-frequency disturbance force oscillation induced in the rotor 11 of the active magnetic bearing 1 by the action of the disturbance force 103, the following method steps are performed:
a) analyzing the low-frequency mechanical disturbance oscillation, which leads to a disturbance force analysis result,
b) determining a compensation force 104 on the basis of the disturbance force analysis result in order to generate a mechanical compensation force in the rotor 11 that counteracts the mechanical disturbance oscillation, and
c) introducing the compensation force 104 into the rotor 11.

Here, the method steps a, b) and c) are performed with the aid of a compensation control loop 14 of the active magnetic bearing 1 that is decoupled from a magnetic bearing control loop 12 for controlling the active magnetic bearing 1.

For the method, two algorithms or one algorithm having two parts is/are used: With part 1 (reference designation 141), the method step a) of the method is implemented.

This involves the detection of high deflections in the low frequency range.

For this purpose, the analysis of the low-frequency mechanical oscillation comprises an analysis of the spectrum in the range of lower frequencies $\omega(\omega_{min}<\omega<\omega_{max})$. For example $\omega_{min}$ is 1 Hz and $\omega_{max}$ is 50 Hz.

To analyze the low frequency disturbance force oscillation, a frequency analysis of a time-based signal of the rotor deflection (e.g. 20 µm) is performed. FFT is used for the frequency analysis.

With the aid of the frequency analysis, disturbance amplitudes $A_{px}$ are determined. By comparing the disturbance amplitudes $A_{px}$ determined and the predetermined limiting amplitude $A_{lim}$, it is established whether the disturbance amplitudes $A_{px}$ are less than, equal to or greater than the predetermined limiting amplitude $A_{lim}$. A query is raised as to whether disturbance amplitudes $A_{px}$ are greater than a permissible limiting value $A_{lim}$.

If a disturbance amplitude $A_p$ is greater than the permissible limiting value $A_{lim}$, the following method steps are performed:

i) determining phase angle and frequency of a maximum magnitude of the rotor deflection (of the disturbance amplitude) in the frequency range examined,
ii) transferring these values $A(\omega_x)$ (amplitude) and $\varphi(\omega_x)$ (phase angle) at frequency $\omega_x$ to the algorithm part 2 (designation 142, see below).

If the disturbance amplitudes $A_{px}$ are less than a permissible limiting value $A_{lim}$, no further action is initiated.

The method steps i) and ii) are performed repeatedly during the operation of the magnetic bearing 1 (recursive performance of the method steps).

According to algorithm part 2, use is made of a method which reduces the maximum amplitude $A(\omega_x)$ determined in the frequency range $\omega_{min}<\omega<\omega_{max}$ to a value below the permissible limiting value $A_{lim}$.

To this end, the compensation force 104 needed for the purpose is determined. To determine the compensation force 104, a frequency-based magnetic force $f_{comp}(\omega_x)$ and a phase $\varphi_f(\omega_x)$ at the same frequency $\omega_x$ (corresponding to the disturbance oscillation frequency) are determined.

The magnetic force determined in this way is transferred to the manipulated variables of the compensation control loop and connected to the amplifier 123. Finally, via the electromagnet 13, the compensation force 104 is introduced into the rotor 11 as a mechanical compensation oscillation. The mechanical compensation oscillation introduced is directed counter to the mechanical disturbance oscillation and leads to the damping of the mechanical disturbance oscillation.

The active magnetic bearing and the method for compensating low-frequency mechanical oscillations are used in a turbo compressor.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:
1. A method for compensating at least one low-frequency mechanical disturbance oscillation which is caused in a rotor having at least one active magnetic bearing as a result of the action of a disturbance force on the rotor, the at least one low-frequency mechanical disturbance oscillation in the rotor occurring with a disturbance oscillation frequency below a rotational frequency of the rotor, comprising the following method steps:
a) analyzing the at least one low-frequency mechanical disturbance oscillation, which leads to a disturbance force analysis result;
b) determining a compensation force on a basis of the disturbance force analysis result in order to generate a mechanical compensation force in the rotor that counteracts the at least one low-frequency mechanical disturbance oscillation; and
c) introducing the compensation force into the rotor, wherein the method steps a), b) and c) are performed with the aid of at least one compensation control loop of the at least one active magnetic bearing that is decoupled from a magnetic bearing control loop for controlling the at least one active magnetic bearing.

2. The method as claimed in claim 1, wherein the method steps a) and b) are performed repeatedly during an operating phase of the at least one magnetic bearing.

3. The method as claimed in claim 1, wherein the method steps a), b) and/or c) are performed with the aid of different algorithms.

4. The method as claimed in claim 1, wherein, in order to analyze the at least one low-frequency disturbance oscillation, a frequency analysis of a time-based signal of a rotor deflection of the rotor is performed.

5. The method as claimed in claim 4, wherein the frequency analysis is performed with the aid of Fast Fourier Transformation.

6. The method as claimed in claim 4, wherein the frequency analysis is performed for a frequency spectrum from a frequency range from 1 Hz to 50 Hz.

7. The method as claimed in claim 1, wherein, in order to analyze the at least one low-frequency disturbance oscillation, a determination of a disturbance amplitude $A_p$ of the disturbance oscillation and a comparison of the disturbance amplitude $A_p$ determined and a predetermined limiting amplitude $A_{max}$ are performed.

8. The method as claimed in claim 7, wherein, by means of a comparison of the disturbance amplitude $A_p$ determined and the predetermined limiting amplitude $A_{lim}$, it is established whether the disturbance amplitude $A_p$ is smaller than, equal to, or greater than the predetermined limiting amplitude $A_{lim}$ and, for the case in which the disturbance amplitude $A_p$ is equal to or greater than the predetermined limiting amplitude $A_{lim}$, a determination of a phase angle φP of the disturbance oscillation is performed and the phase angle φP determined and/or the disturbance amplitude $A_p$ is/are used as input variables for the compensation control loop.

9. The method as claimed in claim 4, wherein the frequency analysis is performed for a frequency spectrum from a frequency range from 1 Hz to 30 Hz.

10. The method as claimed in claim 4, wherein the frequency analysis is performed for a frequency spectrum from a frequency range from 1 Hz to 20 Hz.

11. An active magnetic bearing comprising:
a rotor;
at least one magnetic bearing control loop for controlling the active magnetic bearing; and
at least one compensation control loop, decoupled from the at least one magnetic bearing control loop, for a compensation of an at least one low-frequency mechanical disturbance oscillation, which is caused in the rotor of the active magnetic bearing as a result of an action of a disturbance force on the rotor;
wherein the at least one mechanical disturbance oscillation has a disturbance frequency below a rotational frequency of the rotor.

12. The use of the active magnetic bearing as claimed in claim 11 in a turbo compressor, wherein a rotor of the turbo compressor is supported with the aid of the active magnetic bearing.

* * * * *